Dec. 22, 1942.  T. R. SCOTT ET AL  2,305,903
ELECTRIC CABLE
Filed July 10, 1940  2 Sheets-Sheet 1
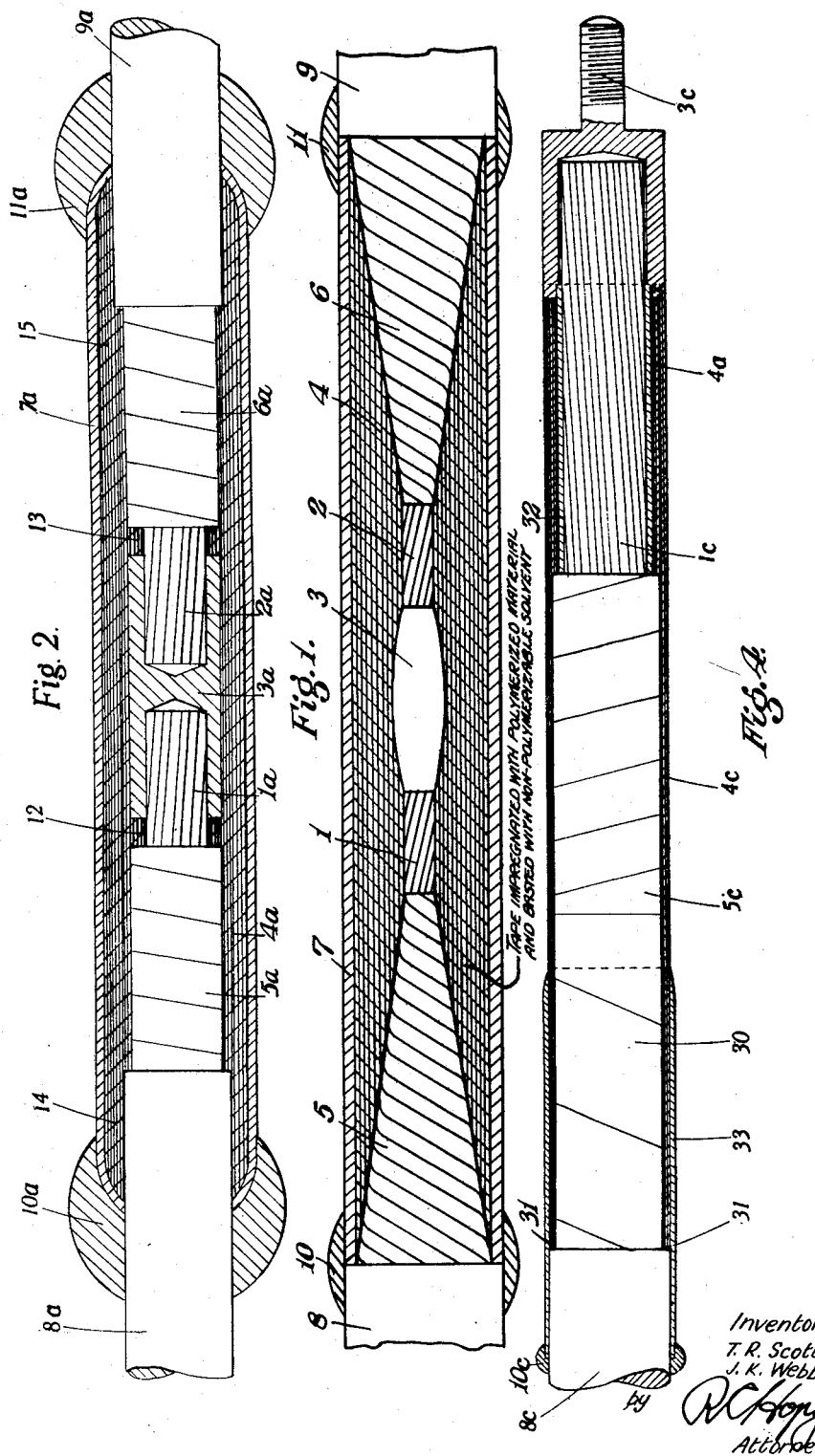
Inventors
T. R. Scott
J. K. Webb
by
R C Hopgood
Attorney Dec. 22, 1942.   T. R. SCOTT ET AL   2,305,903
ELECTRIC CABLE
Filed July 10, 1940   2 Sheets-Sheet 2
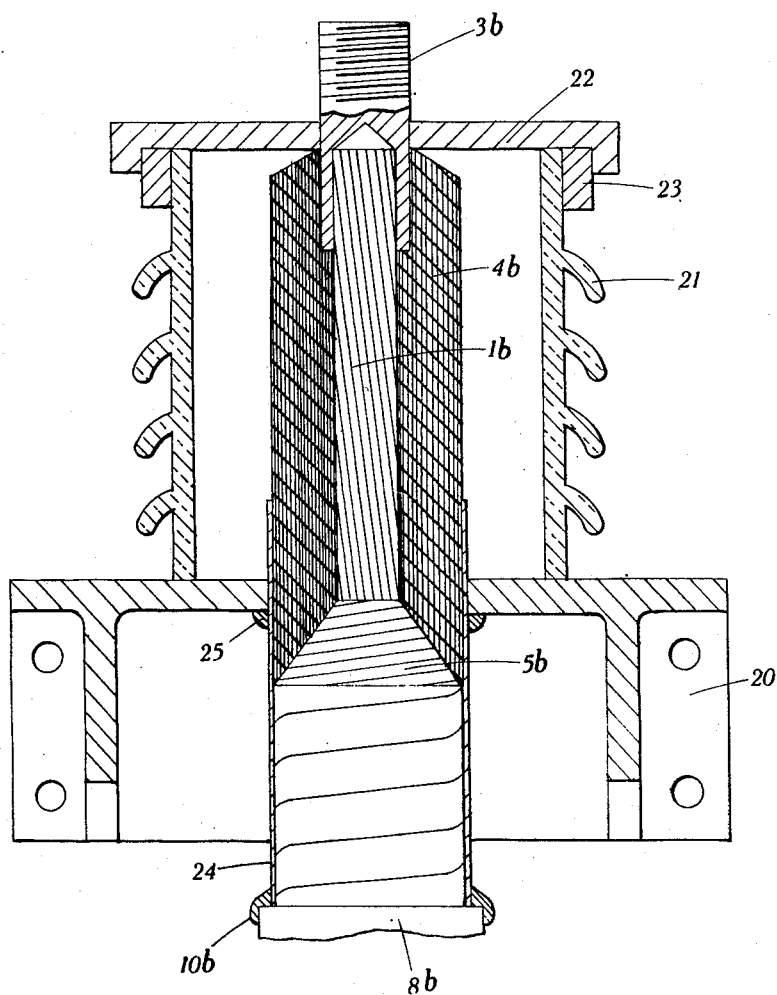
Inventors
T. R. Scott
J. K. Webb
by
Attorney Patented Dec. 22, 1942

2,305,903

UNITED STATES PATENT OFFICE 2,305,903

ELECTRIC CABLE

Thomas Robertson Scott and John Krauss Webb, London, England, assignors to International Standard Electric Corporation, New York, N. Y.

Application July 10, 1940, Serial No. 344,662
In Great Britain July 25, 1939

2 Claims. (Cl. 154—2.23)

The present invention relates to electric cables and more particularly to methods of preparing barriers in impregnated power cables.

In our co-pending application Serial No. 235,182 filed October 15, 1938, issued as Patent Number 2,272,615 on Feb. 10, 1942, we described a method of preparing a barrier joint or termination in an impregnated power cable by building up an insulating barrier with tapes of fibrous insulating material impregnated with polymerised material and basting the impregnated tapes with polymerisable material at intervals during the building-up operation in order to cause them to adhere to one another to form a solid barrier in the cable.

According to the present invention, this prior method is modified by employing a different basting material, viz. instead of using polymerisable material we use a nonpolymerisable material which is a solvent for the polymerised material used to impregnate the tapes.

A better understanding of the invention may be had by reference to the following description, when considered in conjunction with the accompanying drawings, comprising Figs. 1 to 4, wherein:

Fig. 1 is a side elevation, partly in section, of a cable joint constructed in accordance with the invention;

Fig. 2 is a side elevation, partly in section, of an alternate form of cable joint;

Fig. 3 is a side elevation, partly in section, of a cable termination in accordance with the invention; and Fig. 4 is a side elevation, partly in section, of an alternative form of cable termination.

In order to construct a joint of the kind shown in Fig. 1, the lead sheaths 8 and 9 are first stripped from the two cable ends for the required lengths. The cable core sections 1 and 2 are then mechanically and electrically joined together by means of a metal ferrule 3; and the cable insulation 5, 6 comprising paper or other fibrous material impregnated with oil or other fluid is tapered back in the usual manner. Layers of paper or other fibrous tape impregnated with suitable polmerised material are then applied to form a barrier of insulation 4. The tape may be totally impregnated, or may be only surface impregnated (or lacquered) to a sufficient extent for the polymer to bind into the surface of the fibrous material. In the latter case, it may be desirable for the tape to be previously impregnated with an insulating liquid before treatment with the polymer in order to reduce the risk of ionisation at high voltages in the interior of the tape. As each layer of tape is applied it is basted with a nonpolymerisable solvent to fill the interstices between the tapes. This solvent acts as a lubricant enabling the layers of tape to be readily pulled tight, and then causes the tapes to adhere to one another. The successive layers of tape are applied until the tapered cable insulations 5, 6 are completely covered and the built-up insulation 4 has a cylindrical outer surface of the same diameter as the nontapered portions of the impregnated insulation of the cable ends. A protective lead sleeve 7 is then applied over the built-up insulation 4 and is joined to the sheaths 8 and 9 of the cable sections by means of plumbed joints 10 and 11.

The solvent employed to bast the layers of tape forming the insulation 4 should satisfy the following requirements. In the first place, the solvent should be such that the polymerised insulating material used to impregnate the tapes is completely soluble in all proportions in the non-polymerisable solvent. Thus toluene may be satisfactorily used as the solvent when the tapes are impregnated with polyisobutylene; and methylene chloride may be satisfactorily used as the solvent when the tapes are impregnated with polystyrene, but does not give satisfactory results when the tapes are impregnated with polyisobutylene.

In the second place, the amount of non-polymerisable solvent should be limited, so that the solid polymerised material impregnating the tapes is not plasticised or softened to such a degree that the resultant material formed between the layers of tape is subject to plastic flow at low pressures in the normal temperature range experienced by the cable during use.

It is found that polymerised materials such as polystyrene when unplasticised, or when plasticised to a moderate degree, behave as solid materials in the temperature range 15° C.–70° C. until the applied shearing stress reaches values of considerable magnitude. If the amount of plasticiser added is great, or if the temperature is elevated, the applied pressure causes plastic flow and upsets the desired barrier effect. As already explained in our aforesaid application, it is desirable to include a plasticiser in the polymerised material used for impregnating the tapes so that the tapes have flexibility for the lapping process. For example, if the tapes are impregnated with polystyrene, the polystyrene may be plasticised with mono-amyl naphthalene in such proportion that each 100 parts of plasticised polystyrene contains 10–15 parts of plasticiser. If in the process of cementing the tapes together, 15 parts of the non-polymerisable solvent are used for every 100 parts of plasticised polystyrene present, the sum total of the softening or plasticising (considering the solvent as a plasticiser) agents at this stage will amount to 25–30 parts so that the sum total of the softening agents and polystyrene will amount to 115 parts and this ratio will be maintained because, in contra-distinction to the process of our aforesaid application, no further polymerisation can take place after basting. The percentage of softening agent in the impregnant of the completed barrier will then be approximately 22–26%. In general it is found that the combined softening or plasticising content may rise to 25% without undue reduction of the barrier effect though it is better to keep the percentage below 20%. It will therefore in general be desirable to keep the softening content below 20% either by restricting the amount of plasticiser originally included in the polymerised material during impregnation or by restricting the amount of solvent used in the basting process.

In the alternative form of joint construction shown in Fig. 2 the built-up insulation is caused to overlap the sheath of the cable. Those parts which correspond to similar parts in Fig. 1 are given the same reference numerals with the addition of the suffix $a$. The lead sheaths $8a$, $9a$ of each cable length are removed to uncover the impregnated fibrous insulation $5a$, $6a$ which is then stripped back to uncover the conductor ends $1a$, $2a$. The ends $1a$, $2a$ are then jointed in the usual way by means of the ferrule $3a$, and the gaps between the ferrule $3a$ and the insulation $5a$, $6a$ at each side of the joint is lapped with styrene rubber tape $12$, $13$. Lappings of fibrous tape $4a$ which has been impregnated with polymerised material are then applied to the joint, successive layers being basted with a nonpolymerisable solvent in the manner described with reference to Fig. 1. In the present instance, however, the insulation $4a$ is caused to overlap the cable sheaths $8a$, $9a$ at $14$, $15$ on each side of the joint. A lead sleeve $7a$ is provided to enclose and protect the joint and is joined to the sheaths $8a$ and $9a$ by means of plumbed joints $10a$, $11a$. Owing to the fact that the built-up insulation $4a$ overlaps the cable sheaths $8a$, $9a$ there is substantially no possibility of the cable impregnant leaking between the built-up insulation $4a$ and the protective sleeve $7a$. When employing this overlap, the total content of softener in the completed joint may be higher than in the construction according to Fig. 1.

Fig. 3 shows one form of cable termination according to the invention. Those parts which correspond to similar parts in Fig. 1 are given the same reference numerals with the addition of the suffix $b$. In order to construct the termination, the end of the cable is passed through a central opening in a supporting bracket $20$ which is slipped down the cable together with a porcelain insulator $21$. The end of the lead sheath $8b$ is removed to uncover the insulation $5b$ which is then tapered back. The end of the exposed conductor $1b$ is then mechanically and electrically connected to the ferrule $3b$. The exposed conductor $1b$ and the adjacent portions of the ferrule $3b$ and insulation $5b$ are then covered by lapping of fibrous tape $4b$ which has been impregnated with polymerised material, successive layers being basted with a nonpolymerisable solvent in the manner described with reference to Fig. 1. A brass sleeve $24$, which is a tight fit over the cable insulation adjacent to the sheath $8b$, is then slipped over the built-up insulation $4b$ and the cable insulation, and is plumbed to the cable sheath $8b$ at $10b$. A metal disc $22$ is then attached to the ferrule $3b$ and the porcelain insulator $21$ is brought up against the disc $22$ and secured in position by the metal ring $23$. The bracket $20$ is then brought up against the insulator $21$ and is plumbed to the brass sheath $24$, at $25$.

Fig. 4 shows an alternative form of termination according to the invention. Those parts which correspond to similar parts in Fig. 1 are given the same reference numerals with the addition of the suffix $c$. In Fig. 4, $8c$ represents the cable sheath, $5c$ is the fibrous cable insulation which has been uncovered by removal of a portion of the cable sheath $8c$, and $1c$ is the stranded conductor. A brass tube $32$ is slipped over the conductor $1c$ in order to retain the strands of the conductor $1c$ in position. A metal ferrule $3c$ is then secured to the free end of the conductor $1c$. Copper foil $30$ is then lapped around the uncovered cable insulation $5c$ adjacent to the cable sheath $8c$, and is then welded at $31$ to the end of the cable sheath $8c$. Lappings of fibrous tape which has been impregnated with polymerised material are then applied to the termination, successive layers of the tape being basted with a non-polymerisable solvent in the manner described with reference to Fig. 1. The lappings of tape are so applied as to form the built-up insulation $4c$ covering the brass tube $32$, the uncovered cable insulation $5c$ and the copper foil $30$, and having an outer cylindrical surface flush with the cable sheath $8c$. A brass sleeve $33$ is then slipped over the built-up insulation $4c$ and is plumbed to the cable sheath $8c$ at $10c$. It will be appreciated that the built-up insulation $4c$ overlaps the copper foil $30$ which forms an extension of the cable sheath $8c$ so that there is substantially no possibility of the cable impregnant leaking between the built-up insulation and the protective sleeve.

It should be noted that in producing barrier effects at joints and terminations in high tension cable systems it is not always necessary to oppose high pressure gradients acting from one end of the joint or termination to the other end. In the case of barrier joints, all that may be required is the separation of the impregnating oil in one length of cable from the impregnating oil in the length of cable on the other side of the joint, the oil in both lengths being always at approximately the same pressure level. The barrier in this case is inserted to prevent gas and/or moisture travelling along the whole length of the cable system should a fault occur at some point in the lead sheath of the cable. Similarly in the case of a cable termination enclosed in a sealing end containing oil under pressure, the pressure level of this oil may not be very different from that in the cable on the other side of the barrier termination.

What is claimed is:

1. The method of preparing a barrier in an impregnated power cable which comprises lapping a conductive core with successive layers of tape of fibrous material impregnated with polymerized material, basting the outer surface of each layer of tape during the lapping operation with a non-polymerizable solvent for the polymerized material, said polymerized material being highly solvent in said solvent, and limiting the amount of said solvent to less than 25% of the amount of polymerized material contained in said tape.

2. The method of preparing a barrier in an impregnated power cable which comprises lapping a conductive core with successive layers of tape of fibrous material impregnated with a mixture of polymerized material and a plasticizer therefor, basting the outer surface of each layer of tape during the lapping operation with a non-polymerizable solvent for the polymerized material, said polymerized material being highly solvent in said solvent, and limiting the amount of said solvent to such quantity as will together with the quantity of said plasticizer present in said tape not exceed 25% of the quantity of polymerized material present in said tape.

THOMAS ROBERTSON SCOTT.
JOHN KRAUSS WEBB.